Inventor:
Britton H. Doyle,
by Emery, Booth, Miller & Townsend
Att'ys

April 5, 1966 B. H. DOYLE 3,244,140

TAPE DELIVERY GUIDE AND MOISTENER DEVICES FOR TAPE DISPENSERS

Original Filed Aug. 3, 1962 4 Sheets-Sheet 2

Inventor:
Britton H. Doyle,
by Emery, Booth, Miller & Townsend
Attys

Inventor:
Britton H. Doyle,
by Emery, Booth, Miller & Townsend
Att'ys

Inventor:
Britton H. Doyle,
by Emery, Booth, Miller & Townsend
Attys 3,244,140
Patented Apr. 5, 1966

3,244,140

TAPE DELIVERY GUIDE AND MOISTENER DEVICES FOR TAPE DISPENSERS

Britton H. Doyle, Nashua, N.H., assignor to Nashua Corporation, Nashua, N.H., a corporation of Delaware
Original application Aug. 3, 1962, Ser. No. 214,678, now Patent No. 3,208,428, dated Sept. 28, 1965. Divided and this application Mar. 4, 1963, Ser. No. 262,508
14 Claims. (Cl. 118—41)

This application is a division of my copending application Serial No. 214,678, filed August 3, 1962 now Patent No. 3,208,428 of September 28, 1965.

The present invention concerns that class of machines and devices referred to in the industry as strip servers or tape dispensers, for delivering lengths of adhesively conditioned paper and other flexible tape and strip material as for packaging, labeling and other purposes.

Among the object of this invention is to provide for machines of the stated class new and improved constructions, interrelations and functional capacities especially for the mechanism and devices for guiding to delivery and adhesively conditioning lengths of the tape fed from a supply, particularly the organizing thereof as sub-assembly units which are easily and quickly demountable by mere manual withdrawal from operative installation on the machine frame, to facilitate cleaning, reconditioning, replacement or other attention in the field. At the same time the invention as herein disclosed and claimed aims to afford more accurate operative positioning and presentation of the tape-engaging parts concerned, for moistening and delivery guidance of the various tapes now or to become available on the market, including provision for an extensive range of variably controllable pressure application upon the tape at the moistener means therefor.

While herein illustrated for present disclosure purposes as incorporated with a tape dispenser of the automatic type, such for example as that of the patent to Lakso No. 2,776,833 of January 8, 1957 and with which automatic type the improved means of this invention particularly cooperates, the invention in its broader aspects is useful in other types of tape dispensers including the semi-automatic and the manual devices of the general class mentioned.

In the drawings illustrating by way of example one embodiment of the invention:

Figure 1:
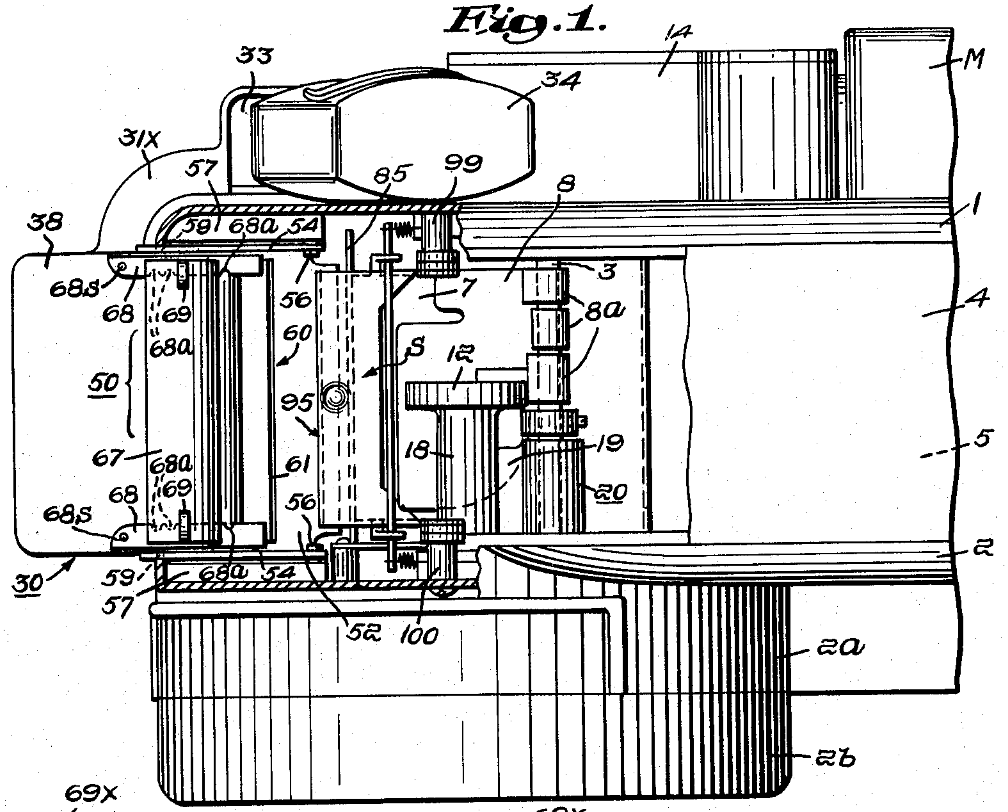
FIG. 1 is a top plan view of the fore portion of a tape dispenser with the top cover in part broken away.
Figure 4:
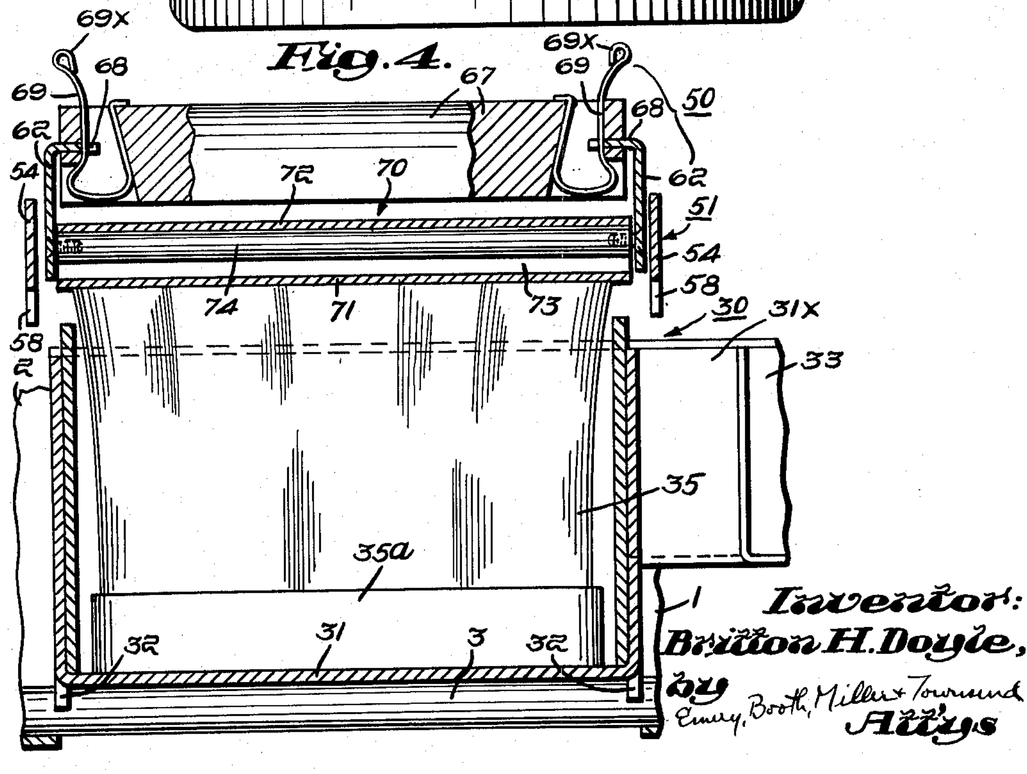
FIG. 4 is a transverse substantially vertical section as on the line 4—4 of FIG. 3, on a larger scale, looking toward the front, i.e. toward the left on FIG. 3.

Preliminary to the more detailed description of the exemplary embodiment illustrated in the drawings, the following considerations will aid the understanding of the major objectives and resultant advantages of the invention. In tape dispensing machines as here concerned, wherein the tape is to be passed over an adhesive conditioner, such as dry-gummed tape across a capillary moistener of the inverted brush form herein illustrated, satisfactory operation is largely dependent on the capacity of the tape body to accept a longitudinal thrusting or pushing action as constrasted with that of being pulled through the moistening station or area.

This push-feed capacity varies with the composition of the tape and the weight thereof, from relatively flaccid tapes at one end of the range through those of medium pliancy and ranging up to those with larger inherent constraint amounting to substantial stiffness or semirigidity approaching a self-supporting ability, but still consistent with sufficient longitudinal flexibility to be supplied in and delivered from roll form.

Such decreased pliancy or increased stiffness, varying in different weights and compositions of gummed tapes, poses difficulties to the obtaining of the proper overall contact of the adhesively conditionable or gummed face of the tape with the underlying moistening element over which it is to be push-advanced. With the more recent increase in the varieties of reinforced tapes and the like which have come upon the market the total range as to the stiffness property of the gummed tapes has so increased that satisfactory moistening for the different tapes with such range has not been obtainable in any one given machine.

The present invention is directed to solving this problem. It does so by providing new and improved tape delivery guiding and depressive means associated with the moistener element of the tape dispensing machine such that one and the same machine is accorded adequate versatility as to range of depressive pressure or loading of the tape to serve the increased total range of tape stiffness.

Heretofore dispensing machines have employed tape depressor or deflector plates pivoted at the rearmost end and having any supplemental loading weight received directly on such plate at points more or less forward of the rear pivot thereof. These have not provided for the selection of a minimal pressure reducible to that as had solely from the deflector plate itself in unloaded condition. Under the present invention however the tape delivery guide assembly in association with the moistener means not only does provide such zero or negative loaded minimum pressures for the more flaccid or light-weight tapes, yet also may instantly be regulated by simple manual selective adjustment and over an extended range to furnish maximum pressures as appropriate for present-day heavy-gauge reinforced tapes.

Turning now to the drawings, as in said parent copending application, the tape dispenser selected for the purposes of illustration comprises a frame or housing with laterally spaced parallel left and right side frames 1 and 2 connected as by cross rods 3, 3. The right side frame 2 has an outwardly laterally projecting auxiliary mechanism compartment *2a* with removable side cover plate *2b*, the later largely broken away on FIGS. 2 and 3. A rear-pivoted top cover 4, FIG. 1, normally resting along the top longitudinal edges of the housing side frames 1, 2 covers the main compartment or housing interior defined between said frames.

Figure 3:
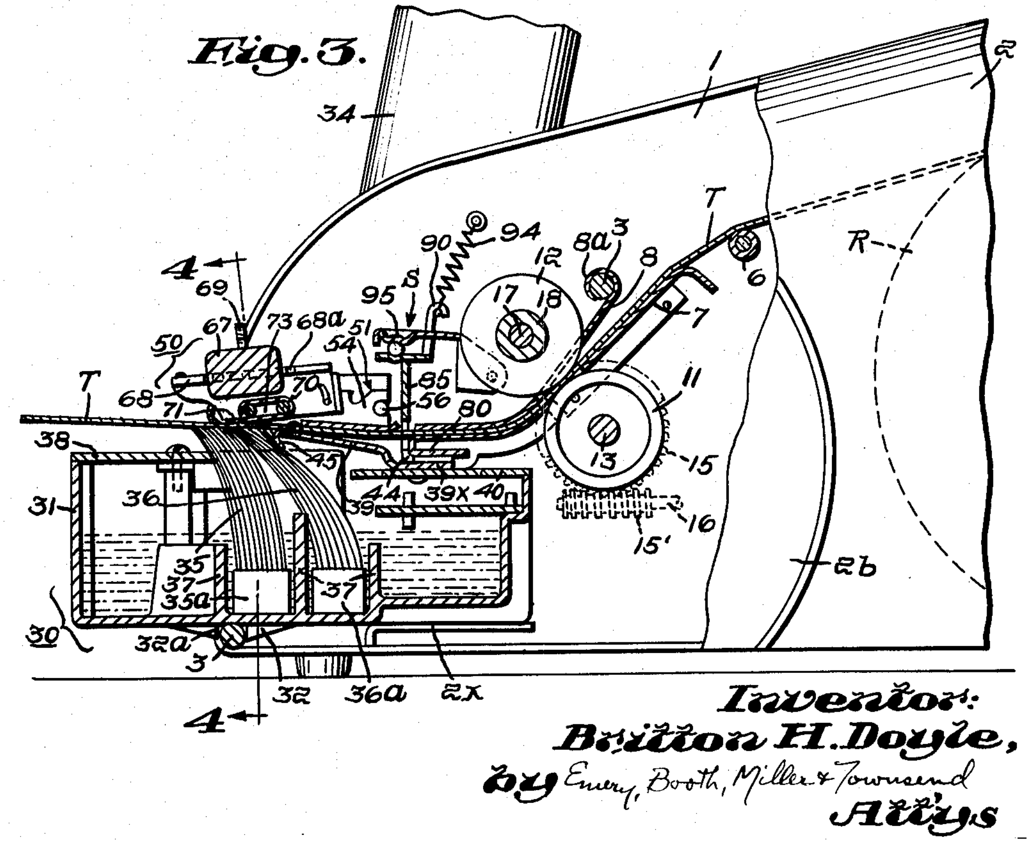
FIG. 3 is a view mainly in longitudinal vertical section substantially central of the same forward portion of the machine as in FIGS. 1 and 2, the section being taken between the opposed side frames.

The tape T from a supply roll R, FIG. 3, in a supporting well 5 between rear portions of the side frames passes forwardly as over a guide roll 6 to a feed channel defined by and between lower and upper guide plates 7 and 8 on the side frames. The upper guide plate 8 is shown as pivotally supported at the rear end as by an overturned hinge portion *8a* loosely received on a cross rod 3. The forward portion of this upper guide plate rests by gravity on the lower plate 7, or on the tape when present between them, with controlled capacity to yield vertically and also to limited extent horizontally for purposes of self-adjustment to different tapes and for floating in hold-down manner on the tape. The feed channel provided by said guide plates 7, 8 extend forwardly to the cut-off or severing station designated generally at S.

Travel of the tape to and past such severing station S to delivery at the front of the machine is accomplished by rotary feed means comprising a pair of opposed and herein bodily separable feed rolls or wheels 11, 12 at an intermediate location along the feed channel plates 7, 8, the latter being apertured for feeding contact by said rolls 11, 12 with the opposite faces of the tape passing between them. One of the feed rolls, the lower roll 11 in the example, is suitably driven by power or otherwise, being herein rotatably mounted on a traverse shaft 13 journaled in the machine housing and extending into a gear box 14 on the left side frame 1, FIG. 1, wherein gearing such as a worm wheel and worm pair 15, 15', FIG. 3, operatively connects said lower feed roll shaft 13 to the shaft 16 of a motor M.

The companion upper feed roll 12 is supported for bodily separating movement to and from feeding relation with the tape and lower roll 11. As shown said upper roll 12 has an axial tubular bearing sleeve 18 whereby it is rotatably mounted on a short transverse shaft 17 at the fore end of one arm 19 of a two-arm lever 20 rockably mounted on the mentioned cross rod 3. The other and downwardly extending arm 21 of said lever has at the lower end a fork 22 straddling a longitudinally movable actuator or control rod 25 between collars thereon, said actuator being moved in one direction, toward the right in FIG. 2, by electromagnetic means 26 under control of the operator to close roll 12 to tape-feeding relation for starting a dispensing cycle. On subsequent release of said electro-magnetic means return of the rolls to normal inactive or non-feeding relation is effected as by spring means 27 adapted to return the actuator rod 25 forwardly, lifting the upper roll 12 and halting the tape feed, with the desired length thereof advanced forwardly past said severing station S.

In such feeding actions lengths of the tape T are advanced beyond said severing station S along a path defined by further tape guiding and adhesively conditioning means, herein of a moisture applying type for use with dry gummed tape. In accordance with the invention such means are constructed and arranged as sub-assemblies or units adapted to be quickly and easily removable by mere manual withdrawal, for inspection and servicing, herein in a manner giving unobstructed access for the hand of the operator or servicer directly to the severing station S.

Such mechanism forwardly beyond the severing station S comprises two cooperative sub-assemblies each constructed and arranged to be manipulated as a unit for installing and demounting them, namely a moistener unit and a tape depressor unit. In mounting and use these units interact with each other and with the severing means with resultant moistening and guiding to delivery of adhesively conditioned severed tape lengths.

The moistener unit is designated generally at 30. It comprises a liquid reservoir or tank 31 of elongate generally rectangular shape and removably disposed on the machine, being adapted to be slid lengthwise into the space between the lower front portions of the side frames 1, 2. The rear portion of the tank 31 is received, guided and supported on opposed slide ways *2x* at the side frame inner faces; FIG. 3. In installed position the tank 31 projects at the front of the machine where it is easily grasped for withdrawal and re-insertion. The tank front portion receives bottom support on a cross rod 3 which also serves as a locating stop for the tank in the longitudinal direction, in cooperation with depending ribs 32 at the tank bottom wall and notched as at 32 to seat on said cross rod 3. The rear under faces of said ribs 32 preferably have a cam-like forward and downward inclination to assist direct horizontal sliding insertion of the tank, camming engagement of said ribs with the cross rod 3 automatically lifting and guiding the tank front end for downward seating of the notches *32a* about the rod; FIGS. 2 to 4 and 6. The illustrated tank 31 has near the front end a laterally offset channel *31x*, FIGS. 1 and 5, communicating between the tank interior and an auxiliary trough 33 extending rearwardly outside the left side frame 1 and supporting a fountain-type inverted container 34 for a reserve supply of moistening liquid to maintain that in the tank at the appropriate level.

The moistener unit 30 further comprises a capillary type moistener below and projecting upwardly into the tape path for moistening engagement with the underface of the tape advanced across it. Such means as shown is of the inverted brush type, in this example comprising two bristle brushes 35, 36 disposed in tandem, with their butts *35a, 36a* downward in seats between locating spacers 37 integrally or otherwise provided in the tank. The projecting free end of the front brush 35 rests forwardly against the rear edge of the tank front top cover plate 38 that provides a delivery station at which the fed lengths of moistened and severed tape are presented to the hand of the operator.

The moistener unit or sub-assembly 30 herein also includes tape guide means thereon forming the lower element of the tape-path-defining guide throat from the severing station S forwardly to the projecting moistening ends of the brushes 35, 36. Noting particularly FIGS. 2, 3, 5 and 6, said guide means on the moistener unit comprises an under-tape guide plate or underguide 39 extending transversely for the full width of and below the tape path. Longitudinally, in the installed operative position of the parts, said tank-carried underguide 39 extends from substantially the transverse vertical plane of the cutter station S and at a level below the front end of the mentioned rear lower guide 7 and of the fixed blade to be described, when it inclines forwardly and upwardly to receive and direct the leading portion of the tape to and across the presented upper ends of the brush moistener element 35, 36.

To facilitate installation of the brushes 35, 36 in the tank 31 and removal from it as for cleaning or other purpose said tank-carried underguide 39 for the tape is disposed on the tank with capacity for retraction thereon relative to the brushes, in the demounted status of the moistener unit 30 as a whole. In the example of the drawings, as best seen on the large scale of FIGS. 5 and 6, said underguide 39 accordingly is slidably mounted on a rear top cover 40 of the tank, which cover is itself preferably removably set on the tank and secured as by screws. A downwardly offset horizontal rearward extension *39x* of said tape underguide 39 rests flatwise on said cover 40. One or more longitudinal guide slots 41 in the latter slidably receive corresponding guide pins 42 depending from said extension *39x* and headed at the lower ends for retention of the underguide 39 on the cover 40. Below the latter a removable horizontal baffle 43 in the tank opposes escape of liquid at said guide slots 41.

The moistener unit 30 further includes means whereby in the act of installing the unit the described slidably retractable underguide 39 is automatically correctly located lengthwise the tape path and with respect to the brush moistener 35, 36 and the severing station S. Accordingly in the example upstanding means on the rear portion of said underguide 39, shown as a plurality of upturned stop lugs 44 on the rear extension 39*x*, is adapted to abut an operatively stationary part on the machine frame, herein the demountable lower blade 80 of the severing means, FIGS. 2 and 3, at points thereon below and operatively clear of the down-stroke of the associated movable blade 85.

Thus as the moistener unit 30 as a whole is inserted into the machine engagement of said stop lugs 44 with said operatively stationary blade 80 limits rearward movement of the underguide 39 and in the calculated somewhat further inward movement of the tank 31 said underguide is in effect shifted forwardly relative to the tank. This action in effect is to thrust said underguide 39 forwardly on and relatively to the tank, in case it has not been returned forwardly thereon after inspection or removal of the brushes, so as to insure contact of said underguide 39 with the projecting upper end of the rear brush 36. Said action in turn compacts the herein tandem brushes 35, 36 between said underguide 39 and the rear edge of the tank front cover 38, giving them appropriate forward and upward inclination substantially as illustrated, and correctly presenting them for efficient moisture application to the gummed underface of the tape advanced across them.

The forward edge of said tape underguide 39 as shown has a downturned and rearwardly inclined transverse lip 45 for the above coaction with the brush moistener. The relative dimensioning of said underguide 39 in the direction of the tape path and as to the distance between the operatively installed brush element and the underguide rear limit stop, herein the lower blade 80 as mentioned, it determined as appropriate for the described automatic positioning of the parts in operative relation by mere insertion of the moistening sub-assembly or unit. The same act of inserting said unit also locks in place said herein slidably demountable but operatively stationary lower blade 80. It is to be noted that with the moistener unit 30 installed the upfacing tape guiding surface of said tank-carried underguide 39 thereof extends uninterruptedly from a point at the severing station S closely adjacent to the transverse vertical plane of tape severance, and forwardly to the moistening element 35, 36 for unobstructed passage of the tape to and across the latter.

Further tape-engaging means included in the total assembly of adhesively conditioning and delivery guiding tape dispenser elements of the invention overlies the described underguide 39 and brush moistener element 35, 36, in the space thereabove between the machine side frames 1, 2. Such further means has top guiding, depressing and holding coaction with the tape as it is moistened and delivered. Said means constitutes a structural and functional part of the adhesively conditioning and delivery guiding mechanism of the machine, includes novel provisions for pressure regulation for the tape at the moistener and is novelly constructed and arranged for operative mounting in and demounting from the machine. This guiding and hold-down means or device, designated generally by the numeral 50, is at times herein referred to as the tape depressor and top guide sub-assembly or unit. It is so correlated with the described moistener unit 30 that these two units 30 and 50 are withdrawably demountable, either of them selectively while leaving the other in place, or both of them together or in either order individually. On demounting both units 30 and 50 direct unobstructed horizontal access is thereby had to the demountable blade elements of the cutter mechanism or sub-assembly. Said cutter assembly or sub-assembly both sub-combinationally and in combination with other features in a tape dispensing machine is more fully disclosed and claimed in said parent application.

Figure 2:
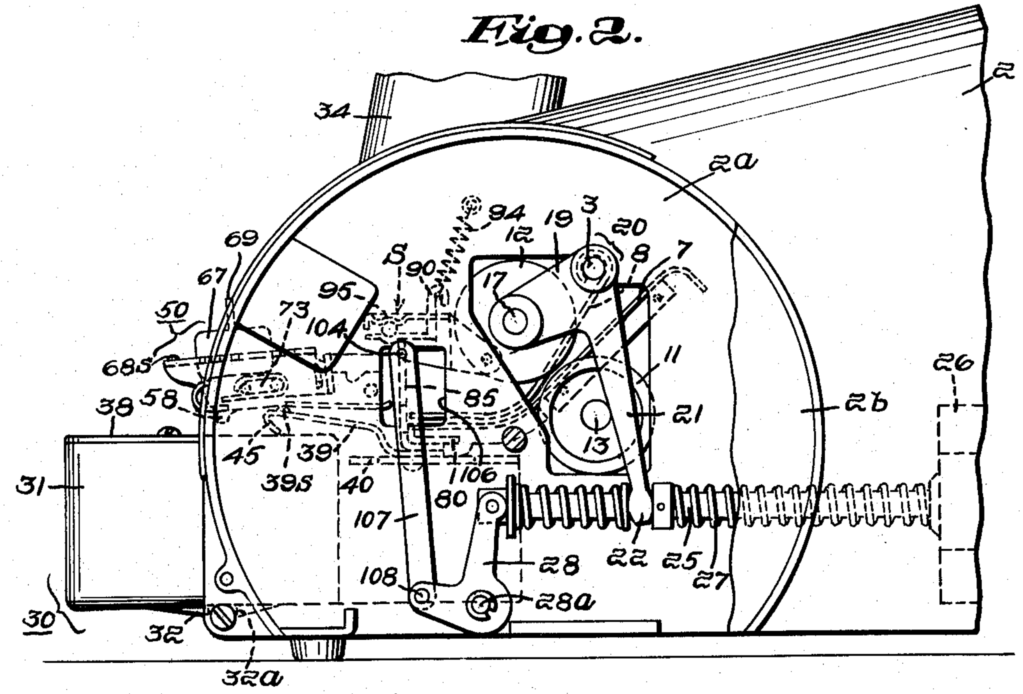
FIG. 2 is an elevation of the right side of the machine with the cover plate of the side parts compartment exterior to the right side frame largely broken away.
Figure 5:
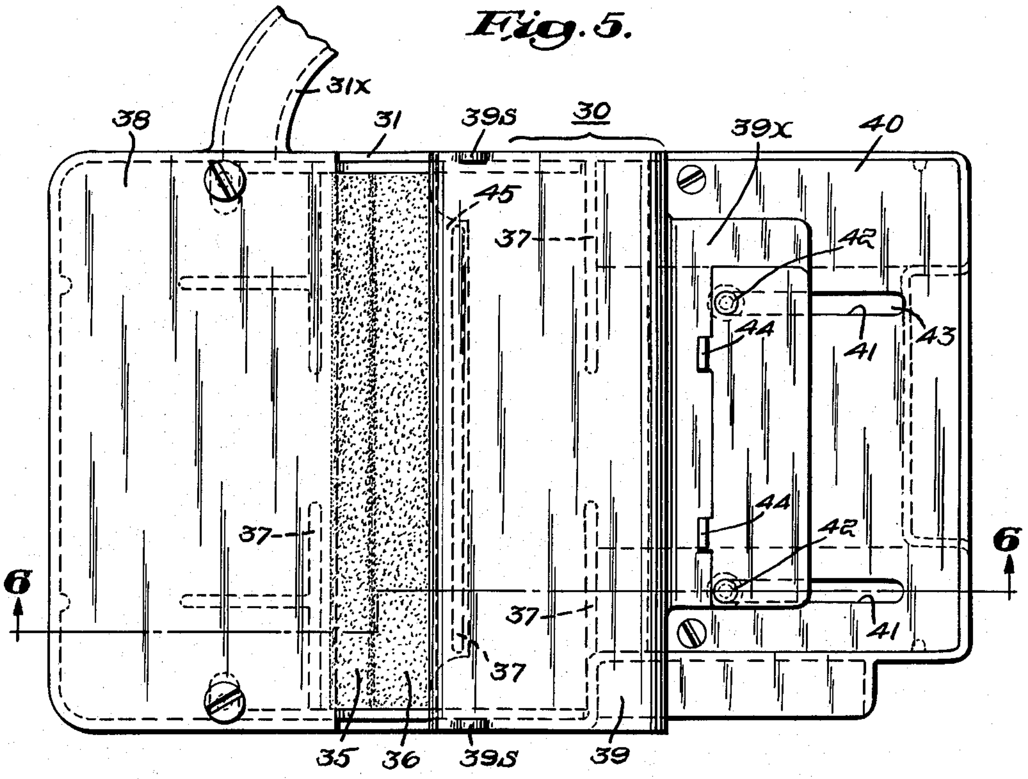
FIG. 5 is a top plan view of the demountable guide and moistener sub-assembly unit, on a similar scale as FIG. 4.
Figure 6:
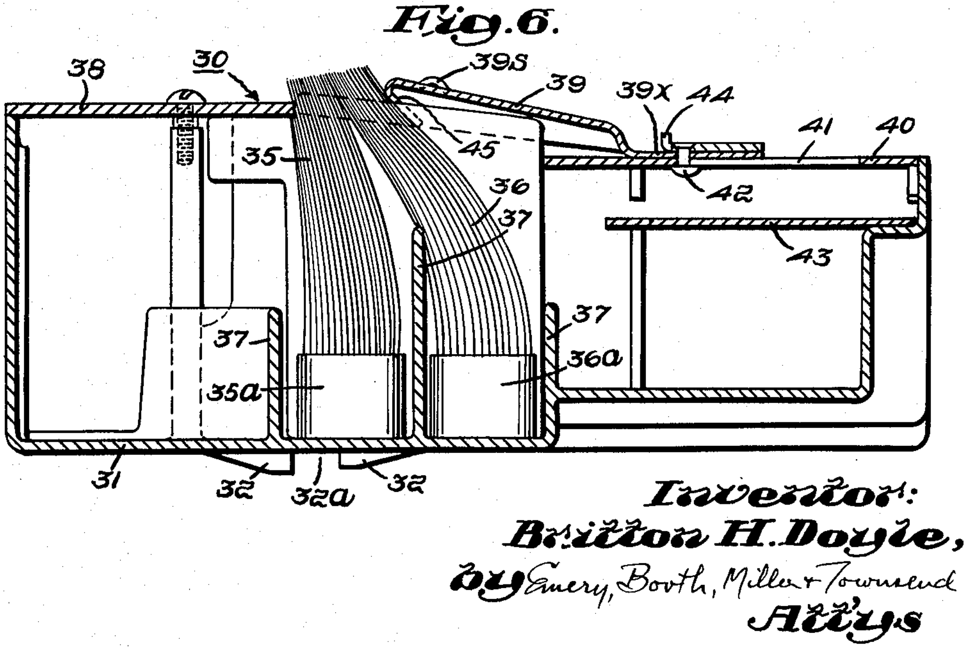
FIG. 6 is a longitudinal vertical section as on the line 6—6 of FIG. 5.
Figures 7, 8:
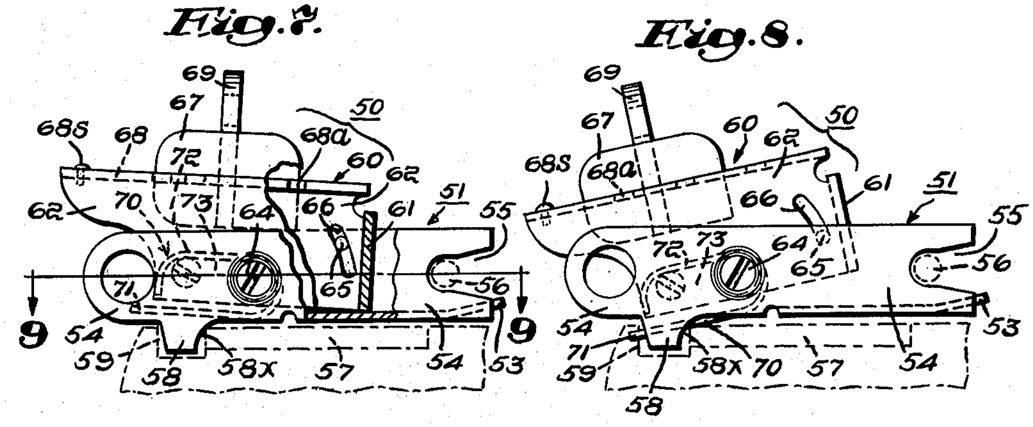
FIG. 7 is a right side elevational view of the demounttable guide and depressor sub-assembly unit on a like scale as FIGS. 4 to 6, with the right side flange of the operatively stationary holder member partly broken away, the pressure regulatory weight being in the total unloading position in the full-line showing thereof.
FIG. 8 is a view corresponding to FIG. 7, with said holder member right side flange shown entire, the regulatory weight and the carrier thereof and of the floating platen being in a position of selective load application to the platen.

As seen in longitudinal central section in FIG. 3, noting also FIGS. 1 and 2, and in enlarged detail in FIGS. 4 and 7 to 9, the top guide and depressor unit 50 has an operatively strationary holder or holding and locating element indicated as a whole at 51 spanning the tape path and including a flat plate 52 overlying and vertically spaced from the described tank-carried underguide 39 and forming with the latter a guide throat for the tape between the severing station S and the brush moistener element. The rear transverse edge portion of said throat plate 52 of the holder 51 is upturned as at 53 for guided admission of the tape as it comes from the rear guide throat 7, 8 behind the severing station S and feeds forwardly through the latter. Vertical spacers at the sides of the underguide 39 and laterally outside the tape path, as at 39S, FIGS. 5 and 6, are adapted to engage the underface of said throat plate 52 and appropriately elevate it relative to the underguide 39 to assure clear passage for the tape through this brush-approaching front guide throat 39, 52.

Said stationary holder 51 of which said throat plate 52 is a part further comprises a pair of laterally spaced upright flanges 54, 54 along the side margins of the throat plate 52, one at each side of the tape path and adjacent the respective machine side frames 1, 2. These laterally spaced parallel flanges 54 have portions projecting forwardly beyond the front transverse edge of the throat plate 52, for pivotally mounting the depressor or floating platen carrier 60 to be referred to. At the rear ends said flanges 54 are formed with rearwardly open notches 55 which in the installed position of the depressor unit 50 as a whole slidably and pivotally engage with positioner studs 56 at the inner faces of the respective adjacent side frames 1, 2. The latter also present opposed generally horizontal guide ribs 57, preferably with a slight rearward and downward inclination, for directing the entire tape depressor unit 50 into operative position under sliding insertion at the front of the machine and then assisting to support it in such position.

Said stationary holder 51 of the depressor unit 50 also is provided with means for locking it, and consequently the entire guide and depressor unit 50 against unintentional forward displacement, said means being automatically interlocked with a fixed portion of the machine frame in the procedure of slidably inserting said unit 50. For this purpose the mentioned pair of flanges 54 have at said forwardly projecting portion thereof depending stops 58 adapted to seat behind fixed shoulders 59 at the front of the machine side frames 1, 2 respectively. Said stops 58 have at the backs thereof cam surfaces 58*x* appropriately upwardly and rearwardly inclined substantially as shown for automatic camming engagement with the top faces of said fixed shoulders 59 on the machine frame thereby to cause the adjacent front portion of the holder 51 to ride up over and then drop behind said fixed shoulders 59, under rearward thrusting insertion of the depressor unit 50 as a whole, thereby automatically locking it in place. At the same time the engagement of said rear notches 55 of the flanges 54 with the studs 56 on the frames serves to limit rearward inserting movement of the depressor unit 50 and also to permit said camming upriding by the holder 51 under vertical rocking movement about said studs as pivots.

The described holder 51 of the sub-assembly unit 50 has mounted on it for rocking about a transverse horizontal pivot axis the platen carrier 60 earlier mentioned. This latter in turn supports the platen or depressor proper 70 for pivotal and controlled floating movement relative to said carrier and in vertical opposition to the brushes 35, 36 and to the tape passing forwardly over them. Said carrier 60 and platen 70 are novelly constructed and arranged for effecting selectively adjustable down pressure on the tape for efficient moistening of the gummed under face thereof in accordance with the particular nature of the tape as to flexibility, weight, width or other physical characteristics earlier mentioned and which cause the tape to require greater or less degree of down pressure on it during its moisture-receiving delivery over said moistener brushes.

Figure 9:
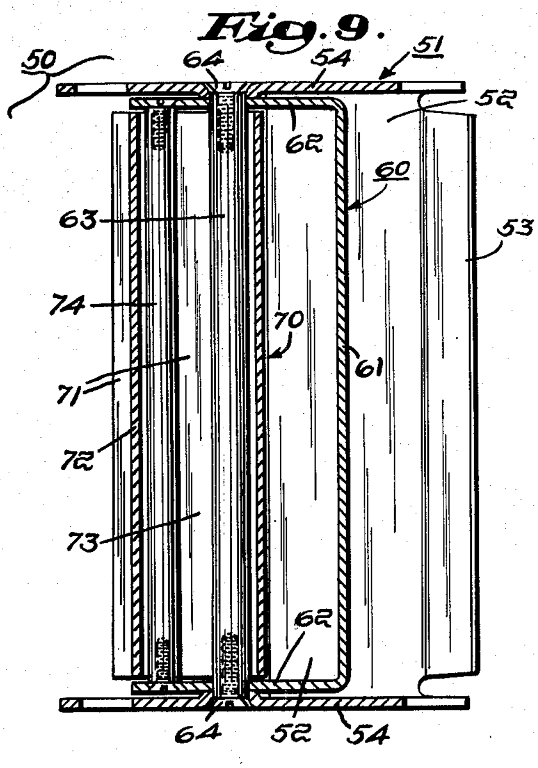
FIG. 9 is a horizontal section as on the line 9—9 of FIG. 7, looking down.

Said platen carrier 60 is of a yoke-like U-form as viewed in plan, FIGS. 1 and 9. It includes a rear crosspiece 61 and forwardly extending longitudinal side legs 62, 62. Said carrier 60 is dimensioned laterally of the machine for reception between the side flanges 54 of the holder 51 with the legs 62 adjacently paralleling them respectively. It is mounted to be able to tilt rockably in a vertical plane paralleling the tape path. The transverse horizontal axis of such tilting is provided by a supporting pivot pin 63 having the ends seated in transversely aligned bearing apertures in midlength portions of said legs 62.

Said pivot pin 63 in turn is bodily mounted on and by the side flanges 54 of holder 51 as by headed screw studs 64 inserted through transversely aligned holes in the respective holder flanges and tapped into the adjacent ends of said pivot pin 63. Down tilting of the fore end of this carrier 60, in the absence of the brush moistener unit below it, is limited by a stop pin 65 at the inner face of one of the holder flanges 54 and projecting into an arcuate slot 66 in said flange and described about the axis of the pivot pin 63 as a center. The carrier tilting movement in the opposite direction, clockwise viewing FIGS. 3, 7 and 8, elevating the fore end of the carrier 60, is limited by downward contact of the lower edge of the carrier rear cross-piece 61 onto the top face of the throat plate 52 of the operatively stationary holder 51; see particularly FIG. 7.

On the tiltable carrier 60 at a level above the axis of tilt defined by the pivot pin 63 and its supporting end studs 64 is a pressure regulating weight 67 spanning between the carrier legs 62, 62. It is slidably adjustably mounted on said legs for shifting toward and from the front ends thereof, as by longitudinal slots let into the respective lateral ends of said weight 67 and slidably receiving therein the inner margins of shelf-like tracks 68 formed in lateral opposition along the upper portions of said carrier legs 62; see particularly FIG. 4. Said tracks 68 each have a series of laterally opposite pairs of weight locating notches 68*a* along the inner edges. The weight 67 is releasably held selectively at any of the notch pairs as by outwardly urged spring detents or latches 69, 69, best seen in FIG. 4, such as U-shaped spring-metal members held with the upright limbs compressed toward each other in vertical recesses that the weight lateral ends and constructed and arranged so that the outer spring limbs of said detents 69 will snap into any selected pair of the notches 68*a* when brought opposite them under manual regulative shifting of the weight 67 along the tracks 68. Said outer limbs of the detents 69 are laterally spaced within easy grasping range between the thumb and finger of the machine operator's hand and have the upwardly projecting top ends rounded over or otherwise formed as at 69*x* for comfortable engagement in such manner for yieldably moving them toward each other to release the detents for said regulatory shifting of the weight 67.

As illustrated the pressure regulatory weight 67 has an extensive range of adjustment. The rearmost notch pair 68*a* determines a rear position in which it overbalances the carrier 60 and compels lifting of the front part thereof so that the platen 70 thereon, to be further described, is entirely relieved of down pressure other than that of its own gravitational weight, leaving it to float freely on the tape at the brushes 35, 36. The other pairs of notches 68*a* are so located on the carrier leg tracks 68 and relative to the carrier pivot axis 63 that forward adjustment of the weight 67 to any of said notch pairs, as determined by automatic engagement of the detents 69, 69 at a selected notch pair, in effect oppositely overbalances the carrier 60, by concentration of the load forwardly of said pivot axis 63.

The appropriate degree of depressive loading for the particular tape being dispensed is selectible by disposing the weight 67 more forwardly for increased loading, and reversely toward the rear of the machine for lesser down pressure on the tape. The down force upon the tape is proportionate to the variable-arm distance to which the center of mass of the effective weight is adjusted relative to the pivotal support axis 63, as between a maximum loading corresponding to the foremost position of weight 67 and a zero or negative loading at the rearmost position. At such rearmost position the mass center is shifted to be behind the transverse line of the pivot axis 63, with the platen-carrying front part of the carrier 60 accordingly elevated, fully freeing the platen 70 for independent floating thereof on the tape. The weight 67 desirably is stopped against unintended escape from its supporting tracks or ways 68, herein at the rear end thereof by the carrier rear cross-piece 61 and at the front ends of the tracks by stop nubs 68*s* thereon for said purpose.

Said platen 70 as herein illustrated comprises a flat bottom piece 71 with smooth downface for contacting and depressingly guiding the tape passing below it with the brush-facing gummed face of the tape in appropriate moisture-receiving relation to the vertically opposite updirected ends of the moistener brushes 35, 36 as determined by the described selective platen-pressure adjustment. Said platen bottom piece 71 is of a dimension longitudinally of the machine to extend from the front edge of the described operatively stationary throat plate 52 of the holder 51 of this guide-depressor unit 50 and well forward into vertical opposition to said moistener means 35, 36. For operatively retaining the platen 70 while lending the described floating capacity thereto the bottom piece 71 has an integral hanger portion herein provided by a forwardly overturned extension 72 of the rear margin of the bottom piece 71, giving the platen 70 as a whole a flattened hollow tubular form in cross-section, said extension including a vertical rear wall, a top wall spaced above and generally paralleling the bottom piece 71, and a retaining front wall downturned toward said bottom piece, the latter together with said walls of the extension 72 defining an operatively enclosed space as indicated at 73 extending across the tape path and having said flattened tubular cross-sectional form with the major cross-sectional dimension disposed in the direction of the tape path.

The dimensioning of said platen-retaining space is made sufficient to receive the mentioned pivot pin 63 of the carrier with considerable vertical as well as horizontal clearance, and similarly to receive a second retainer means spaced in front of said relatively fixed pivot pin 63 but mounted on the tiltable carrier 60. Said forwardly spaced means is shown as a bar 74 spanning between the legs 62 of said carrier 60 and removably held thereon as by screws extending inwardly through and tapped into the respective ends of said legs. Said front platen-retainer means 74 is of lesser cross-sectional dimension at least vertically than the pivot pin 63, or the retainer space 73 is vertically enlarged, or both, to accord vertical pivotal capacity to the platen 70 relative to the operatively fixed pivot pin 63 as an axis. Additionally the location and longitudinal spacing between said pivot pin 63 and said front retainer bar 74, also the major cross-sectional dimension of the retainer space 73 in the direction paralleling the tape path, are so calculated as to afford self-adjusting bodily freedom for the platen forwardly and rearwardly in said direction.

Thus the platen 70 has vertical pivotal capacity, for higher or lower positioning of its front portion for self-adjustment to the brush moistener means 35, 36, together with the bodily free-floating capacity for the like purpose, subject also to the selectively controllable down-pressure adjustment through the weight and the table carrier as described. It is further notable that the tape-guiding under face of the platen bottom piece 71, which is of full tape-path width for any width of tape up to the maximum for the given machine, also has substantial extent lengthwise the tape path, giving the platen 70 amply extensive operative area for pressure-regulated depressing contact with the tape and in vertical opposition to a correspondingly large area of the brush moistener means, all in the presence of the substantially universal bodily adjustive capacity of the structural example as illustrated and described herein.

In the operation of the tape feeding, guiding and adhesively conditioning means as exemplified in the drawings it will be understood that the tape T from the supply roll R is advanced by the rotary feed means 11, 12 through the severing station S and by the medium of the delivery-guiding and depressor unit 50 and its operatively associated moistener unit 30 is directed forwardly across the moistener means 35, 36 and through the delivery station at the delivery table provided by the described tank front cover plate 38. There the trailing end of the fed and severed length of adhesively conditioned tape is temporarily held between the brushes and the depressor-guide unit 50 including the platen 70, ready to be picked up for applicational use by the operator.

As earlier mentioned, the severing station S between the feed roll means 11, 12 and the moistener element proper 35, 36 comprises an operatively stationary knife or blade 80 and a cooperating movable knife or blade 85, the latter shown as of a guillotine type, FIGS. 1 to 3. As in the parent application the stationary blade 80 is slidably removably mounted in guides on the machine frame. The interengagement between said stationary blade 80 and the tape underguide 39 of the moistening unit, for mutual operative locating and retaining purposes, has been noted. Otherwise the mechanism assembly here chiefly concerned, comprising the moistener sub-assembly 30 and the tape guide and depressor sub-assembly 50, is susceptible of general use in gummed tape dispensers with various different tape severing means. That herein illustrated is as more fully shown and described in said parent application but for the purposes of the present application will be understood as representative of but one suitable arrangement. Hence it is sufficient here to note that the vertically movable blade 85 is operatively mounted for up and down action by a carrier yoke 95 horizontally pivoted on the side frames 1, 2, as at 99, 100, FIG. 1 and to which yoke the knife blade 85 is demountably connected through hanger arms 90 and retainer springs 94. Such carrier yoke 95 has a lever arm pivotally connected as at 104 through a frame opening 106 to a vertical link 107 in the mentioned mechanism compartment **2*a*, which link 107 is pivoted at its lower end as at 108, FIG. 2, to the front arm of a two-arm bell-crank 28 rockably journaled as at 28*a* on the side frame 2. The other or rear arm of said bell-crank 28 is forked at the projecting end to straddle and have pivotal connection to the fore end of the previously mentioned actuator rod 25 for automatic actuation by it upon return movement of the latter following a tape feeding action. Thus the movable blade 85 is operatively coordinated with the described feed-roll opening and closing means, through the same actuator rod 25 therefor; rearward movement of said actuator rod 25 for closing the feed rolls 11, 12 to start a tape delivery also insures that the movable blade 85 is above and clear of the tape path; and conversely the return forward movement of said actuator rod 25 halts the tape advance, by separation of the feed rolls, in readiness for cutting descent of the movable blade 85** onto the tape at the severing station S.

From the preceding description taken in connection with the illustrative example of the drawings it will be understood that among other advantages the invention affords what is herein termed "pick-out demountability" for the total assembly of adhesively conditioning and delivery guiding tape-engaging parts concerned, more particularly in this application the moistener sub-assembly or unit 30 and the tape delivery guiding and depressor sub-assembly or unit 50; also that said parts are grouped, constructed and arranged in sub-assembly units which are novelty correlated not only with respect to the improved functions of each in the tape dispensing cycles but also with respect to the aspect of such pick-out demountability and whereby the moistener units 30 and the delivery guiding and tape depressor unit 50 may be installed and demounted with minimum loss of machine operating time, enabling an inexperienced or unskilled operator to accomplish the same. It is here again noted that in accordance with the invention the tape-engaging parts forwardly beyond the cutter assembly at the severing station, including the moistener unit 30 and the delivery guide and depressor unit 50 are themselves demountable as sub-assembly units, by slight manual uplift at the front of each followed by direct forward pick-out withdrawal, so that the main central space between the side frame front portions is left clear and unobstructed for direct manual access to the severing station and the cutter mechanism thereat, which latter as a sub-assembly and also in combination in the machine as a whole is a subject of the claims of my identified parent copending application.

It will be understood that throughout the description directional terms such as "vertical," "horizontal" and others are employed for purposes of descriptive identification rather than limitation to a particular or absolute positioning of the parts concerned.

The present invention is not limited to the particular embodiment as herein illustrated and described, the scope thereof being pointed out in the appended claims:

I claim:

1. In an adhesively conditionable tape dispensing machine of the type having longitudinal side frames along and between which lengths of the tape are to be advanced by rotary feed means from a roll supply for adhesively conditioned delivery at the machine front, in combination therewith, a plurality of tape-engaging sub-assembly units forwardly of such feed means and past which the tape is to be successively advanced by said means, said units comprising an adhesively conditioning unit and a tape delivery guide and depressor unit, said adhesively conditioning unit comprising an elongated generally rectangular tank, an inverted brush moistener projecting therefrom, there being guide ways on fore portions of the machine frames to support and direct sliding insertion of the tank therein, and there further being interengaging means on the machine frame and on the tank to releasably lock the latter in operative position, said adhesively conditioning unit further comprising a tape underguide slidably mounted at the top rear portion of the tank and having a transverse front flange for positioning contact with the brush moistener, and there being interengageable members on the machine frame and on said tape underguide and positioned and arranged for abuttive contact in the sliding insertion of the tank thereby to insure said positioning contact of the underguide flange at the brush moistener, and said tape delivery guide and depressor unit comprising a depressor holder demountably received on guides on the machine frames adjacent said tank and having a generally horizontal plate portion to overlie said underguide and to form therewith a guide throat for the tape, there being spacer means on the tank for presenting said holder plate portion in said throat forming relation, said guide and depressor unit further comprising a bodily tiltable carrier mounted on a horizontal pivot axis on said depressor holder, a tape depressor plate vertically movably mounted on said carrier, and a pressure controlling weight slidably mounted on the carrier for selectively adjustable movement horizontally toward and from the pivot axis thereof for regulating the pressure-weighting of said depressor plate upon tape passing beneath it across the brush moistener in a range between zero weighting and attendant free-floating of said depressor up to a maximum effective imposition of the pressure of said weight upon the depressor when the weight is farthest spaced from the carrier pivot.

2. In an adhesively conditionable tape dispensing machine of the type having longitudinal side frames along and between which lengths of the tape are to be advanced by rotary feed means from a roll supply for adhesively conditioned delivery at the machine front, in combination therewith, an adhesively conditioning unit comprising an elongated generally rectangular tank, an inverted brush moistener projecting therefrom, there being guide ways on fore portions of the machine frames to support and direct sliding insertion of the tank therein, and there further being interengaging means on the machine frame and on the tank to releasably lock the latter in operative position, said adhesively conditioning unit further comprising a tape underguide slidably mounted at the top rear portion of the tank and having a transverse front flange for positioning contact with the brush moistener, and there being interengageable members on the machine frame and on said tape underguide and positioned and arranged for abuttive contact in the sliding insertion of the tank thereby to insure said positioning contact of the underguide flange at the brush moistener.

3. In an adhesively conditionable tape dispensing machine of the type having longitudinal side frames along and between which lengths of the tape are to be advanced by rotary feed means from a roll supply for adhesively conditioned delivery at the machine front, in combination therewith, a tape delivery guide and depressor unit comprising a depressor holder demountably received on guides on the upper fore portions of the machine frames and having a generally horizontal plate portion to overlie the tape path so as to form the top wall of a guide throat for the tape approaching delivery at the front of the machine, a bodily tiltable carrier mounted on a horizontal pivot axis on said depressor holder, a tape depressor plate vertically movably mounted on said carrier, and a pressure controlling weight slidably mounted on the carrier for selectively adjustable movement horizontally toward and from the pivot axis thereof for regulating the pressure-weighting of said depressor plate upon tape passing beneath it in a range between zero weighting and attendant free-floating of said depressor up to a maximum effective imposition of the pressure of said weight with respect to the depressor plate when the weight is farthest spaced from the carrier pivot.

4. A tape dispensing machine according to claim 1 in which there is provided a severing station between the feed means and the brush moistener, said station including a stationary blade below and spanning the tape path, the tank of the adhesively conditioning unit being of a length to extend rearwardly below said stationary blade, and said stationary blade being constituted as the member on the machine frame which is interengageable with a member on the tape underguide slidably mounted on the tank for insuring said positioning contact of said underguide with the brush moistener.

5. In an adhesively conditionable tape dispensing machine having a frame, a support thereon for a tape supply roll, guide means defining a path for the tape to a delivery station at the machine front, a moistener element below the tape path adjacently behind the delivery station and means to advance the tape from the supply to said station, the combination therewith of a tape delivery guiding and depressor assembly unit on the frame above the tape path and in vertical opposition to the moistener element, said unit comprising a stationary holder with longitudinal flanges at the respective sides of the tape path and a throat plate extending between said flanges for directing the tape forwardly below it, a yoke-like platen carrier including transversely spaced forwardly extending side legs within and paralleling said holder flanges and a rear cross piece connecting said legs, a transverse pivot pin having the ends thereof respectively held on the holder flanges, said platen carrier having in the side legs thereof transversely aligned bearing apertures for mounting it on said pivot pin with capacity to tilt vertically relative to said stationary holder, a depressor platen transversely extending between the carrier side legs and including a flat bottom piece for contacting the upper face of the tape to guide the same forwardly from said throat plate of the holder and across the moistener element together with an upwardly and forwardly overturned extension defining with said bottom piece a sleeve-like enclosure transversely across the platen and being of substantial extent in the direction of the tape path, said carrier-mounting pivot pin being received in the rear portion of said enclosure as a pivotal locating hanger for the depressor platen on and with respect to the carrier, a further transverse bar within and loosely receiving the front portion of said enclosure of the depressor platen and according to the latter capacity to float upon the tape, and a regulating weight slidably mounted on and between the carrier side legs for adjustive movement thereon forwardly and rearwardly in the tape path direction and relative to the axis of the stationary pivot pin whereon the carrier is tiltable and through a range between a rearward limit wherein the combined mass of the carrier and weight is rearward of the pivot pin axis and the front portion of the carrier is swung upwardly to leave the depressor platen free to float on the tape solely under its own mass and forward adjusted positions wherein the center of mass of the platen and weight is shifted forwardly and effects down-tilting of the front portion thereof for operatively loading the depressor platen and to extents proportionate to the extent of forward adjustment of the weight.

6. An assembly unit for guiding gummed tape in adhesively conditioning relation over a brush moistener of a tape dispensing machine, comprising a holder adapted to straddle the tape feed path adjacent such moistener and including longitudinal side flanges and a cross-connecting tape guide plate to overlie said path and terminating rearwardly of the front portions of said flanges, a vertically tiltable carrier on said holder between said flanges thereof and including a rear cross-piece above the fore portion of said guide plate of the holder and longitudinal side legs extending forwardly from said cross-piece, pivot means for tiltably mounting said carrier on and between the holder flanges and defining a horizontal pivot axis transverse of the carrier and intermediate said cross-piece and the front ends of said legs thereof, a tape path overlying depressor operatively hung on and between said legs of the carrier with capacity for limited vertical bodily shifting movement relative to the carrier and to the tape path so as to rest by gravity on tape passing beneath it, at times solely under the weight of said depressor element itself and at the other times under augmented weight, and a depressor pressure regulating weight mounted on said carrier for fore and aft movement thereon relative to said horizontal transverse pivot axis of the carrier for selective setting of the pressure of the depressor upon the tape passing over the moistener below it.

7. An assembly unit according to claim 6 wherein the depressor is of flattened tubular form with the length thereof transverse to the tape path and including a flat bottom piece for contacting the upper face of the tape and an upper hanger and locating portion, the carrier having between the fore parts of the legs thereof a transverse hanger bar loosely received in the fore part of said upper portion of the depressor about it.

8. An assembly unit according to claim 6 wherein the depressor is of flattened tubular form with the length thereof transverse to the tape path and including a flat bottom piece for contacting the upper face of the tape and an upper hanger and locating portion, the rear portion of said upper hanger and locating portion loosely pivotally receiving transversely therethrough said pivot means which tiltably mounts the carrier on the holder.

9. An assembly unit according to claim 6 wherein the depressor is of flattened tubular form with the length thereof transverse to the tape path and including a flat bottom piece for contacting the upper face of the tape and an upper hanger and locating portion, the rear portion of said upper hanger and locating portion loosely pivotally receiving transversely therethrough said pivot means which tiltably mounts the carrier on the holder, and said carrier having between the fore parts of the legs thereof a transverse hanger bar also loosely received in said upper portion of the depressor element forwardly of said carrier pivot means of the holder.

10. An assembly unit according to claim 6 wherein the tiltable carrier is provided with guides along the side legs and paralleling the tape path and the depressor pressure regulating weight is slidably adjustable along said guides.

11. An assembly according to claim 10 wherein said guides and the weight are provided with a longitudinal series of interengageable formations for locating the weight at pressure-controlling positions along said guides as appropriate for a given tape and attendant operating conditions.

12. An assembly according to claim 11, including releasable detent means for retaining the weight in any selected position along the guides.

13. An assembly according to claim 6 including means defining a forward limit for the regulating weight on the carrier, and interengageable stop means between the rear portion of the carrier and the stationary holder for limiting the forward and downward tilting of the carrier.

14. An assembly according to claim 6 including rearwardly open slot formations at the rear ends of the holder sides for receiving corresponding locating lugs on the frame of a tape dispenser, and the lower margins of the holder sides having stop means receivable behind a stationary part of such dispenser frame to removably retain the holder in operative installation thereon.

References Cited by the Examiner

UNITED STATES PATENTS

| | | | |
|---|---|---|---|
| 2,305,424 | 12/1942 | Hoitt | 118—253 |
| 2,506,673 | 5/1950 | Krueger | 118—253 |
| 2,547,584 | 4/1951 | Krueger | 118—253 |

CHARLES A. WILLMUTH, *Primary Examiner.*

LEON MACHLIN, *Assistant Examiner.*